No. 646,518. Patented Apr. 3, 1900.
A. COMPTON.
APPARATUS FOR CANNING FRUITS OR VEGETABLES.
(Application filed Feb. 17, 1896.)
(No Model.)
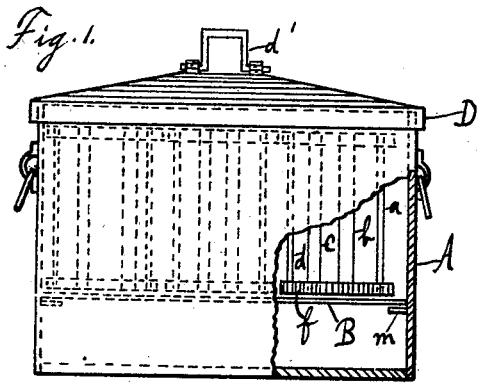
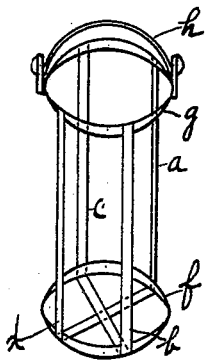
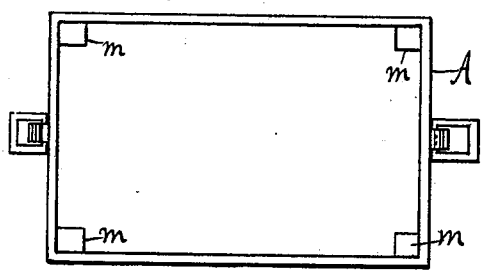
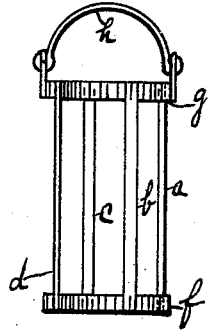
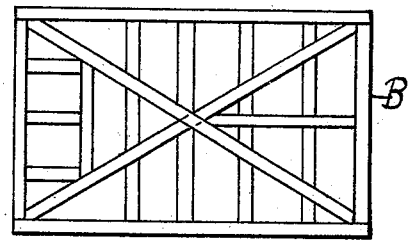
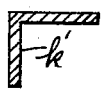
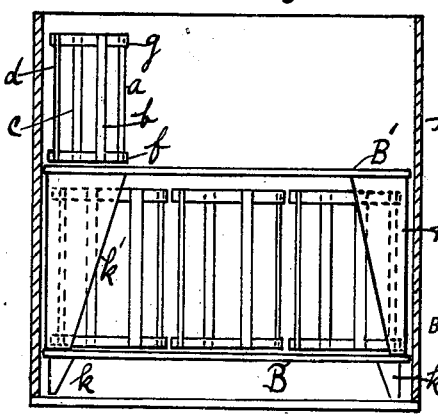
WITNESSES:
INVENTORS,
Anna Compton,
BY A. L. Jackson,
THE NORRIS PETERS CO., PHOTO-LITHO., WASHINGTON, D. C.

UNITED STATES PATENT OFFICE.

ANNA COMPTON, OF FORT WORTH, TEXAS.

APPARATUS FOR CANNING FRUIT OR VEGETABLES.

SPECIFICATION forming part of Letters Patent No. 646,518, dated April 3, 1900.

Application filed February 17, 1896. Serial No. 579,601. (No model.)

*To all whom it may concern:*

Be it known that I, ANNA COMPTON, a citizen of the United States, residing at Fort Worth, in the county of Tarrant and State of Texas, have invented certain new and useful Improvements in Apparatus for Canning Fruit or Vegetables, of which the following is a specification.

My invention relates to apparatus for canning fruit and vegetables and other perishable matter, and has for its object to construct and combine several parts for the purpose of heating fruit and other articles by steam in closed receptacles and to facilitate the removal of the jars from the steaming vessel. In accomplishing this object I have devised individual casters which can be supported on ordinary crates in vessels suitable for boiling water and retaining the steam developed by the boiling of the water. By means of these casters single jars may be removed and all the jars in a vessel may be removed and refilled in rotation. In this way a person can have as many jars as he can fill and seal in a certain space of time, and as he can remove any jar without disturbing the other jars he can fill a jar and put it in the place of one which has been sufficiently steamed. Consequently there will be no loss of time, no jar will be steamed too much, and no jar will have time to become cool while waiting to be sealed.

Other objects and advantages will be fully understood from the following description and claims when taken in connection with the accompanying drawings, forming a part of the specification.

Similar characters of reference indicate corresponding parts in the several views.

Figure 1 is a side elevation in detail and showing a section of the boiler torn away. Fig. 2 is a plan view of the boiler. Fig. 3 is a plan view of the crate. Fig. 4 is a sectional detailed view. Fig. 5 is a perspective of one of the casters. Fig. 6 is a side elevation of a caster. Fig. 7 shows a fruit-jar. Fig. 8 is a sectional view.

In the drawings, A indicates an ordinary boiler.
B and B' indicate crates.
D indicates a covering for the boiler.
In Figs. 5 and 6, *a*, *b*, *c*, and *d* indicate the uprights which connect the bottom *f* and top *g* of the casters, and *h* indicates a bail or handle for the casters. The uprights *a* and *d* and *b* and *c*, respectively, may be one piece.

In Fig. 2, *m* indicates brackets or rests for the crate.

In Fig. 8, *k k* represent legs which are attached to the crate B, and *k' k'* legs attached to crate B'. These legs are to be used instead of brackets *m*. One or more crates can be put in one boiler if the boiler is large enough. When more than one crate is used, the legs of the upper one will have to be long enough to rest on the crate next below. The space in the boiler below the crate is filled with water.

The boiler shown in Fig. 1 is intended to hold six half-gallon jars or twelve quart-jars. That shown in Fig. 8 can hold twelve half-gallon jars or twenty-four quart or six half-gallon and twelve quart jars. The casters for handling the jars enable a person to remove readily any jar from the boiler.

As shown in Fig. 4, the legs *k'* are formed right angular in cross-section, so that in affixing them to the crate B' each will extend along the adjoining sides of the angle forming the corner of the crate. This prevents all tendency of the crate to sag or the legs to be forced through the material forming the crate, as there is formed an elongated support which extends some distance along each side from the corner, said elongated or extended support preventing sagging of the crate when the loaded casters are placed in position thereon. As the crates are of substantially the area of the interior of the boiler, the legs will fit within the corners of the boilers, and thus tend to prevent any endwise or lateral movement of the crates while in the boiler and serve as guides during the placing in position or the removal of the crates, compelling such crates to be moved in a true horizontal position, preventing the disturbance of the contents of the jars contained within the casters, such disturbance having a tendency to spoil the contents. In addition to this the forming of the legs in this manner allows of the use of light material without sacrificing any of the required strength, and while the legs are of considerable size they do not interfere with the close nesting of the casters within the boiler. Another advantage lies in the fact that in placing the crate in position there is no requirement of a nicety of adjustment on the lower crate, an advantage which will be readily understood when it is remembered that the crates become exceedingly hot.

While I have described the boiler as rectangular in form and implied that the corners thereof are made at right angles, the crates and the legs $k'$ being of a form to fit in said corners, it is to be understood that I may make the corners of the boiler rounded, the crates being formed in a similar manner, the legs $k'$ in this form having the angle formed rounded, but arranged to have the elongated extended portion above referred to extending along both of the sides adjoining the corner without departing from the spirit and scope of my invention.

In use the fruit or other articles are put in the jars and thoroughly packed down. The jars are then put in the casters. The casters are then set on the crate within the boiler. The water below the crate up to this time must be cool, so that the jars will not be broken by the sudden change of temperature. The water is then boiled, and the steam generated by boiling the water is retained in the boiler by lid D, and the fruit is cooked by steam. The jars are then taken out of the boiler and filled as full as possible with boiling syrup. The syrup must be poured in the jars slowly, so that the fruit will absorb the syrup as it is settling in the jars.

I do not confine myself to the size and proportion of the several parts as described, as variations may be made without departing from my invention.

Having fully described my invention, what I claim as new, and desire to secure by Letters Patent, is—

1. The herein-described apparatus for canning fruit, consisting of a rectangular-shaped boiler A having a removable top or cover D; a removable lower crate B of substantially the area of the interior of the boiler, said crate being supported in said boiler near the bottom thereof; a removable upper crate B' of substantially the same area as the crate B; and supporting-legs for said crate B', each of said legs having an angular construction in cross-section, said legs being connected to the corners of said crate, the connecting portion of said legs extending along the adjoining sides forming the corners of said crate, said legs fitting within the corners of said boiler and resting on the corners of the crate B, whereby tendency of said crate B' to sag and have endwise or lateral movement is prevented; and a series of independent casters, adapted to removably hold the fruit being canned, removably mounted on said crates, substantially as and for the purpose set forth.

2. The herein-described apparatus for canning fruit, consisting of a rectangular-shaped boiler A having a removable top or cover D; a removable lower crate B of substantially the area of the interior of the boiler, said crate being supported in said boiler near the bottom thereof; a removable upper crate B' of substantially the same area as the crate B; and supporting-legs for said crate B', each of said legs being right angular in cross-section, said legs being connected to the corners of said crate, the connecting portion of said legs extending along the adjoining sides forming the corners of said crate, said legs fitting within the corners of said boiler and resting on the corners of the crate B, whereby tendency of said crate B' to sag and have endwise and lateral movement is prevented; and a series of independent casters, adapted to removably hold the fruit being canned, removably mounted on said crates, substantially as described.

ANNA COMPTON.

Witnesses:
JAMES GILFORD BROWNING,
JOHN MARION MOTHERSHEAD.